Patented Dec. 4, 1945

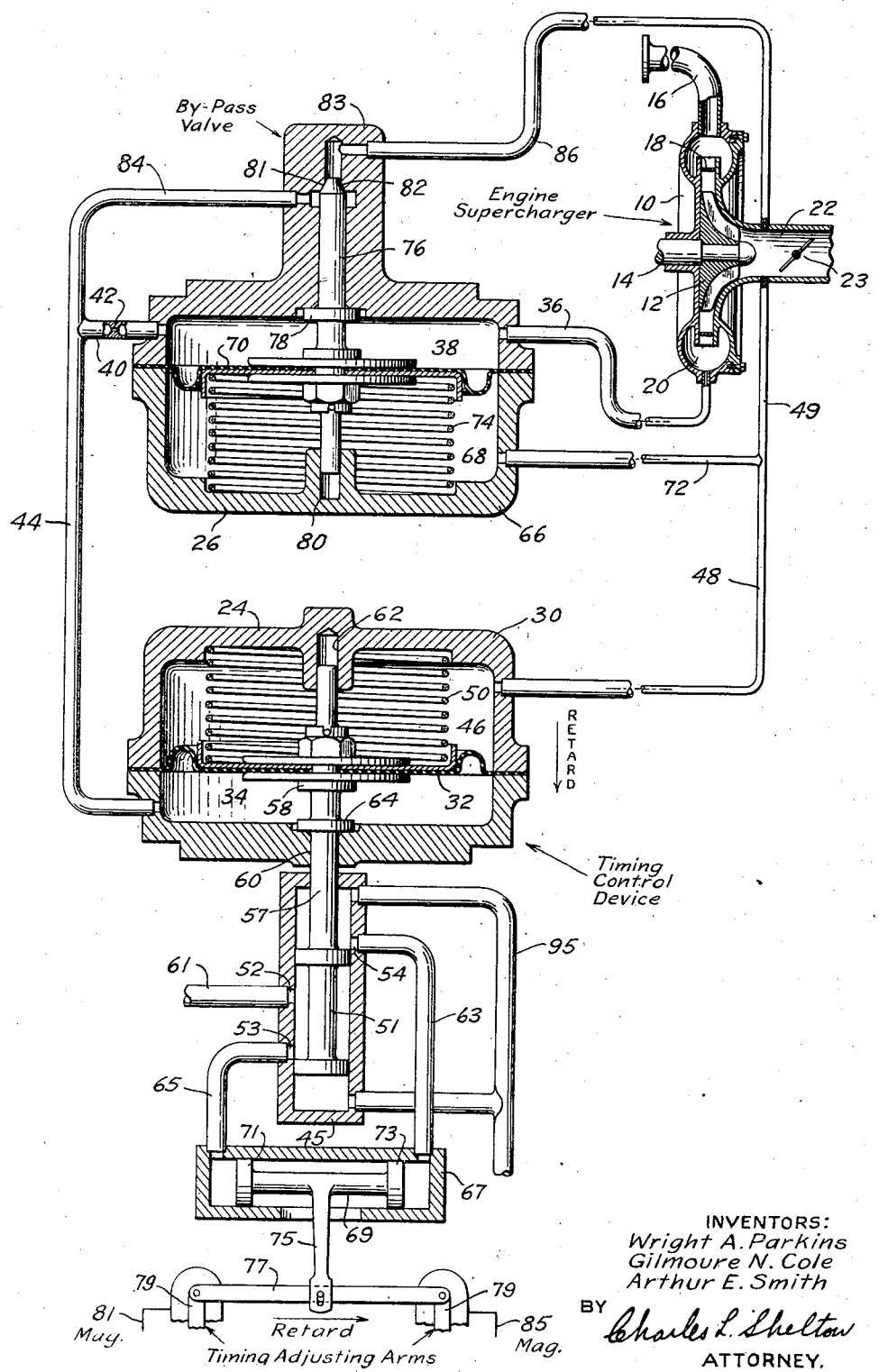

2,390,166

UNITED STATES PATENT OFFICE 2,390,166

IGNITION TIMING

Wright A. Parkins, West Hartford, and Gilmoure N. Cole, Manchester, Conn., and Arthur E. Smith, Kansas City, Kans., assignors to United Aircraft Corporation, East Hartford, Conn., a corporation of Delaware Application March 18, 1943, Serial No. 479,600

8 Claims. (Cl. 123—117)

This invention relates to improvements in ignition timing controls for internal combustion engines.

An object of this invention is to provide an improved method and apparatus for controlling the ignition timing of a supercharged engine by variations in the pressure rise produced by the supercharger.

Other objects and advantages will be apparent from the specification and claims, and from the accompanying drawing which illustrates what is now considered to be a preferred embodiment of the invention.

In the drawing, the single figure thereof illustrates, in schematic form, a device for controlling the ignition timing of an internal combustion engine by the pressure rise across a supercharger, and a control valve for regulating the pressure applied to the timing control device.

The efficiency and power of an internal combustion engine is largely dependent upon the phase relationship between the pressure rise and fall in the compressed mixture in the interval immediately following ignition, and piston positions during this interval. While the geometry of the pressure curve will vary with changes in factors such as fuel mixtures, charging pressures, and engine speeds, which change during normal engine operation, the time of initiating the explosion relative to the piston position may be controlled at will, either manually or automatically. In an attempt to maintain the most advantageous phase relationship for different engine operating ranges, the prior art discloses various devices for controlling the ignition timing, or the time of ignition of the charge relative to piston position. Such devices have been operated by governors to advance the ignition timing in response to an increase in engine speed and by vacuum devices to retard the timing upon an increase in intake manifold pressure. According to the prseent invention, the ignition timing is varied by changes in the pressure rise produced in the intake air or fuel air mixture by an engine driven supercharger. Because the pressure rise across the supercharger is an indication of the engine power output this variable may be utilized to provide the desired conditions of retarded spark during the periods of starting, idling, and full power engine operation and advanced spark only during the intermediate or cruising range of engine output.

Referring to the drawing in detail, a supercharger 10 is provided with an impeller 12 rotated by an engine driven shaft 14. The rapidly rotating impeller pumps air or a fuel-air mixture into the engine by way of an induction system including intake pipes, one of which is shown at 16. Diffuser vanes 18 act to change the velocity pressure of the fluid leaving the impeller to static pressure in the collector ring 20. Throat 22 admits air or a combustible mixture to the supercharger impeller 12. A throttle 23 is positioned in the passage leading to the supercharger throat.

Timing control device 24 is connected across the supercharger and to the ignition system for the purpose of varying the timing by changes in the pressure rise produced across the supercharger. Control valve 26 acts to regulate the amount of fluid pressure applied by the supercharger to device 24. While only a single supercharger stage is shown in the drawing, the apparatus of this invention is also applicable to one or more stages of a multi-stage supercharger.

Device 24 comprises a casing 30 provided with a diaphragm 32 forming a chamber 34 therein. Supercharger outlet pressures are applied to chamber 34 by way of conduit 36, a chamber 38 in the valve 26, conduit 40 containing restriction 42, and conduit 44. Diaphragm 32 also forms a chamber 46 in the casing 30, which is connected to the throat 22 of the supercharger by way of conduits 48 and 49. Spring 50 in casing 30 acts to bias diaphragm 32 in a direction to retard the ignition timing.

The ignition device may comprise adjustable dual magnetos or any other type of variable timing device. For instance, the timing control mechanism may be of the type disclosed in U. S. application Serial No. 469,931, filed December 23, 1942, by John S. Hasbrouck, for ignition timing control devices. In the form shown in the drawing, a lever 77 interconnects the adjustable arms 79 of the magnetos, partially shown at 81 and 85.

To adjust the timing control mechanism by movements of diaphragm 32 a valve plunger 51 is moved in valve casing 45 relative to valve ports 52, 53, and 54 by stem 57, to which the diaphragm is clamped between shoulder 58 and nut 59. Stem 57 is reciprocated by the diaphragm in bearings 60 and 62 of the casing. Movement of the stem in a spark retarded direction is limited by flange 64 abutting against the casing and in this position valve 51 connects oil pressure line 61 with a conduit 65 to admit oil to a servomotor 67 having a piston 69, which is actuated by the pressure oil to adjust the magnetos, by means of arm 75 attached to the piston, to the spark retarded position. Upward movement of stem 57 (in a spark advanced direction) is limited by abutment of the top of the stem 57 against the casing 30. In this raised position valve 51 connects pressure line 61 with conduit 63 to admit oil to the servomotor in a direction to force piston 69 to the left and actuate the lever 77 to move the timing control arms 79 to the spark advanced position. As the pressure oil is admitted to one side of piston 69, the other side is drained through conduit 85. This specific arrangement for moving the timing control of the magneto or ignition mechanism in response to movements of diaphragm 32 is shown for the purpose of illustration only and it will be apparent that other means may be used to adjust the spark setting according to the position of the diaphragm 32.

Control valve 26 comprises a casing 66 having a diaphragm 70 separating the casing into chambers 38 and 68. Chamber 38 is connected to the induction system on the high pressure side of the supercharger by conduit 36 and is included, as previously described, in the passage for the fluid pressure to chamber 34 of the timing device 24. Chamber 68 of valve 26 is connected to the blower throat by conduits 72 and 49. A spring 74 between diaphragm 70 and casing 66 acts to bias the diaphragm in a valve closing direction and may be made adjustable if desired.

Diaphragm 70 is provided with a stem 76 secured thereto in a manner similar to the connection of stem 57 with diaphragm 32 of device 24. Stem 76 may be limited in movement in casing 66 in a valve closing direction by flange 78 and in a valve opening direction by abutment of one end of the stem with the wall portion 80 of the casing.

The other end of the stem is provided with a valve head 82 cooperating with a valve seat 81 formed in an extension 83 of casing 66. This valve head acts to provide open, or closed communication between the conduit 84 forming an extension of conduit 44 and conduit 86 connected to the blower throat 22.

The operation of the apparatus is as follows: At low engine speeds, such as idling speeds, the pressure difference between collector ring 20 and throat 22 will be at a minimum. This pressure difference will be transmitted on the high side through chamber 38 and conduit 44 to chamber 34 and on the low side through pipes 48, 49 to chamber 46 of the ignition control device 24. However, the tension of spring 50 is so selected as to maintain the diaphragm against this idling pressure in a fully spark retarded position, with the stop 64 abutting the lower wall of the casing. Upon an increase in the pressure rise across the supercharger to an intermediate engine power output range (for instance to above 6" Hg), the diaphragm 32 will be raised against the action of spring 50 to reciprocate the stem 57 and move the valve 51 upwards to a position admitting pressure fluid from conduit 61 to conduit 63, which will admit oil to the servo-motor in a direction to advance the ignition timing. The spring rate of spring 50 may be selected to be very low in order that this shift to fully advanced spark position may be quickly and completely effectuated upon a change from engine idling to engine cruising range; in other words, a very small increase in pressure rise across the supercharger above that required to just move stop 64 away from casing 30 will move stem 57 to the fully advanced position.

Upon a further increase in the pressure rise, for instance as would be occasioned by a further increase in throttle opening to the high power range of engine operation, the spark is retarded through the following action of valve 26. Diaphragm 70 of the valve 26 is moved against the action of spring 74 by the high value of the pressure difference across diaphragm 70. Spring 74 is selected to have a tension such as to maintain the diaphragm 70 in its valve closed position against the forces exerted by lower or intermediate pressure rises across the supercharger, but to be compressed by the force of the higher range of fluid pressures (for instance above 11" Hg) exerted upon the diaphragm 70. These higher pressures act to compress spring 74 and move stem 76 and valve head 82 away from valve seat 81 in the casing extension 83. Opening of the valve head 82 will bleed pressure from chamber 34 by way of conduits 44, 84, and 86 to the blower throat 22 thus reducing the pressure in chamber 34, for instance to less than 6" Hg. Restriction 42 (which may be made adjustable) acts to maintain a sufficiently high pressure in chamber 38 to actuate valve stem 76 and limit the amount of fluid that will be by-passed back to the blower throat when the fluid in chamber 34 of device 24 is being bled to the throat 22 by pressure relief valve 26. In other words, the opening of valve head 82 is sufficient to bleed air from the line 44 more rapidly than it can be supplied through the restriction 42, which results in a movement of the diaphragm 32 to the spark retarded position.

The size of the restriction 42, the areas of the diaphragms 32 and 70, the tension and spring rate of springs 50 and 74, and the shape of valve head 82 and seat 81 are preferably so selected as to fully advance the ignition timing upon attainment of an intermediate range of pressure difference across the supercharger (corresponding to the engine cruising range), to maintain this fully advanced position over the intermediate range, and then shift the timing to fully retarded position at a higher range of values of the pressure rise across the supercharger or blower. In other words, the apparatus may be made to act as a two position timer providing stable and consistent spark timing for three ranges of engine operation.

It is to be understood that the invention is not limited to the specific embodiment herein illustrated and described, but may be used in other ways without departure from its spirit as defined by the following claims.

We claim:

1. In combination with an engine having a supercharger driven at a speed dependent upon engine speed and an adjustable electric ignition system, a fluid pressure actuated device for adjusting said ignition system to change the timing thereof, conduits for admitting fluid under pressure from the outlet and inlet sides of said supercharger to said device, and a valve associated with at least one of said conduits for controlling the amount of pressure exerted on said device by said fluid.

2. In combination with an internal combustion engine, a conduit for supplying a charge thereto, a supercharger driven at a speed dependent upon engine speed in said conduit, a pressure responsive device connected to said conduit on the outlet and the inlet sides of said supercharger, means for adjusting the ignition timing of the engine by said pressure responsive device, and means for varying the effect on said pressure responsive device of the pressure difference across said supercharger at higher values of said pressure difference.

3. In combination with an internal combustion engine having an adjustable ignition system and an induction system including a variable position throttle, a supercharger driven at a speed dependent upon engine speed in the induction system between the throttle and the engine, a timing control device connected with the outlet and the inlet of said supercharger for adjusting the timing of the ignition system by the pressure difference between said outlet and inlet, and means including an interruptible passage for reducing the effect of said pressure difference upon said device at higher power outputs of said engine.

4. An automatic ignition timing apparatus for an internal combustion engine having a supercharger driven at a speed dependent upon engine speed comprising, a timing control device having a movable diaphragm therein, chambers on either side of said diaphragm, high and low pressure conduits connecting said chambers respectively to the outlet and to the inlet of said supercharger for moving said diaphragm to a spark advance direction upon an increase in the pressure difference across said supercharger, a spring for moving said diaphragm to a spark retarded position upon a decrease in the pressure difference across said diaphragm, a restriction in said high pressure conduit, means for by-passing pressure fluid from said high pressure conduit on the chamber side of said restriction to said low pressure conduit, and means for rendering said by-passing means effective only over the higher range of the pressure rise across said supercharger.

5. In a spark timing control apparatus for an internal combustion engine having a magneto-electric ignition apparatus including an adjustable timing element and an induction system including a supercharger driven at a speed dependent upon engine speed for producing a pressure rise therein, a timing control device having a movable diaphragm, means responsive to movements of said diaphragm for adjusting said timing element, a pressure-relief valve having a movable valve operating diaphragm therein, a valve operated thereby, a spring for biasing said valve to a closed position, a high pressure conduit having a restriction therein, a low pressure conduit, means for subjecting said conduits respectively to the outlet and inlet pressure of said supercharger, means connecting said high pressure conduit on one side of said restriction with one side of said control diaphragm and on the other side of said restriction with one side of said valve operating diaphragm, means connecting the other sides of both said diaphragms with said low pressure conduit, and means connecting said valve with opposite sides of said control diaphragm.

6. In a method of controlling the ignition timing of an internal combustion engine having an adjustable timing device and a supercharger, the steps of adjusting said timing control device by the pressure difference developed across said supercharger during engine operation, and reducing the effect of said pressure difference upon said timing control device at higher power outputs of the engine operating range.

7. In combination with an engine having a supercharger driven at a speed dependent upon engine speed, and a spark ignition system; pressure responsive means subjected on one side to the pressure on the high pressure side of the supercharger and on the other side to the pressure on the low pressure side of the supercharger, means operated by said pressure responsive means for adjusting the spark of the ignition system from its retarded to its advanced setting when the difference in pressure on the opposite sides of said pressure responsive means increases in response to an increase in supercharger speed from a relatively low to an intermediate value, and means causing a reverse movement of said pressure responsive means upon a further increase in supercharger speed to a relatively high value for returning said spark to its retarded setting.

8. In an aircraft engine having an adjustable ignition system and a supercharger, a servo-device for adjusting the timing of said ignition system, means connected with the outlet and inlet sides of said supercharger for actuating said servo-device in accordance with variations in the pressure rise developed across said supercharger during engine operation, and means automatically operative within a predetermined portion of the engine operating range for controlling the adjustment of said ignition system by said servo-device.

WRIGHT A. PARKINS.
GILMOURE N. COLE.
ARTHUR E. SMITH.